United States Patent
Karlsson

[19]

[11] Patent Number: 5,921,212
[45] Date of Patent: Jul. 13, 1999

[54] INTAKE SYSTEM FOR MULTI-CYLINDER COMBUSTION ENGINES

[75] Inventor: Jan Karlsson, Västra Frölunda, Sweden

[73] Assignee: AB Volvo, Gothenburg, Sweden

[21] Appl. No.: 08/981,853

[22] PCT Filed: Jun. 28, 1996

[86] PCT No.: PCT/SE96/00870

§ 371 Date: Apr. 6, 1998

§ 102(e) Date: Apr. 6, 1998

[87] PCT Pub. No.: WO97/03278

PCT Pub. Date: Jan. 30, 1997

[30] Foreign Application Priority Data

Jul. 11, 1995 [SE] Sweden .................................. 9502548

[51] Int. Cl.⁶ .................................................. F02B 27/00
[52] U.S. Cl. .................. 123/184.47; 123/184.49
[58] Field of Search ......................... 123/184.42, 184.43, 123/184.44, 184.47, 184.48, 184.49

[56] References Cited

U.S. PATENT DOCUMENTS

| 4,838,215 | 6/1989 | Yasuda et al. | 123/184.49 |
|---|---|---|---|
| 5,018,485 | 5/1991 | Washizu et al. | |
| 5,088,454 | 2/1992 | Washizu et al. | |
| 5,090,202 | 2/1992 | Hitomi et al. | |
| 5,109,811 | 5/1992 | Tanaka et al. | |
| 5,156,116 | 10/1992 | Scherenberg | 123/184.44 |
| 5,186,126 | 2/1993 | Tarekado et al. | 123/184.44 |
| 5,490,484 | 2/1996 | Rutschmann | 123/184.49 |

FOREIGN PATENT DOCUMENTS 0 633 397  1/1995  European Pat. Off. .

*Primary Examiner*—Marguerite McMahon
*Attorney, Agent, or Firm*—Burns, Doane, Swecker & Mathis, LLP

[57] ABSTRACT

An intake system for internal combustion engines with multiple cylinders, comprising a first air distribution chamber, one separate inlet pipe for each engine cylinder, which inlet pipes extend between the first distribution chamber and the respective inlet valve/valves of the corresponding cylinder, and a second air distribution chamber. The second chamber is connectable to each one of the inlet pipes between the first chamber and the inlet valves via a respective passage which passage can be opened by means of an operable valve. The valves are simultaneously operable between closed and open positions via control means with regard to the speed of the engine. The second air distribution chamber receives inlet air via an adjustable throttle valve. The first air distribution chamber is divided into two volumes, being connectable via an additional openable valve, wherein each volume is connected to the second distribution chamber via at least one resonance pipe. The valve of the first air distribution chamber is maneuverable between closed and open positions via control means with regard to the speed of the engine.

6 Claims, 4 Drawing Sheets

INTAKE SYSTEM FOR MULTI-CYLINDER COMBUSTION ENGINES

TECHNICAL FIELD

An intake system for internal combustion engines with multiple cylinders, comprising a first air distribution chamber, one separate inlet pipe for each engine cylinder, which inlet pipes extend between the first distribution chamber and the respective inlet valve/valves of the corresponding cylinder, and a second air distribution chamber, which is connectable to each one of the inlet pipes between said first chamber and the inlet valves via a respective passage which passage can be opened by means of an operable valve, which valves are simultaneously operable between closed and open positions via control means with regard to the speed of the engine.

BACKGROUND OF THE INVENTION

EP 94850128.3 describes an active intake system for multiple cylinder combustion engines, comprising a first air distribution chamber, one separate inlet pipe for each engine cylinder, which inlet pipes extend between the first chamber and the respective inlet valve/valves of the cylinders. Also, there a second air distribution chamber which is connectable to each one of the inlet pipes between said first chamber and the inlet valves via a respective passage which passage can be opened by means of an operable throttle valve. The second chamber is connected to the first chamber via resonance pipes, the inlets to the second chamber being openable via a further throttle valve. This solution enables exploitation of the resonance frequency for an advantageous volumetric efficiency within the middle and upper engine speed ranges.

In many cases, it is desirable to instead provide a more advantageous volumetric efficiency within a lower range of engine speed. This is relatively simple to accomplish, but in that case it is normal to get a dip in the moment curve effecting the middle range of the engine speed. Such a dip is perceived by the driver of a vehicle, as if the engine lacks power in the middle range. Therefore, the normal driver tends to use unnecessary high revs in order to keep the engine out of the dip in the moment curve. This results in that the positive effect of the increased volumetric efficiency in reality disappears for these known arrangements.

THE TECHNICAL PROBLEM

The object of the present invention is therefore to provide an intake system which offers a more advantageous volumetric efficiency within a lower range of engine speed, without affecting the middle range of engine speed.

THE SOLUTION

This has been achieved according to the invention in that the second air distribution chamber receives inlet air via an adjustable throttle valve, in that the first air distribution chamber is divided into two volumes, being connectable via an additional openable valve, wherein each volume is connected to the second distribution chamber via at least one resonance pipe, and in that the valve of the first air distribution chamber is manoeuvrable between closed and open positions via control means with regard to the speed of the engine.

Advantageous variants of the invention are disclosed in the accompanying subclaims.

DESCRIPTION OF THE DRAWINGS

The invention will be described more in detail in the following, with reference to embodiments shown in the enclosed drawings, on which FIG. 1 discloses schematically an intake system according to the invention, which is adapted to a six-cylinder combustion engine.

DESCRIPTION OF EMBODIMENTS

Figure 1:
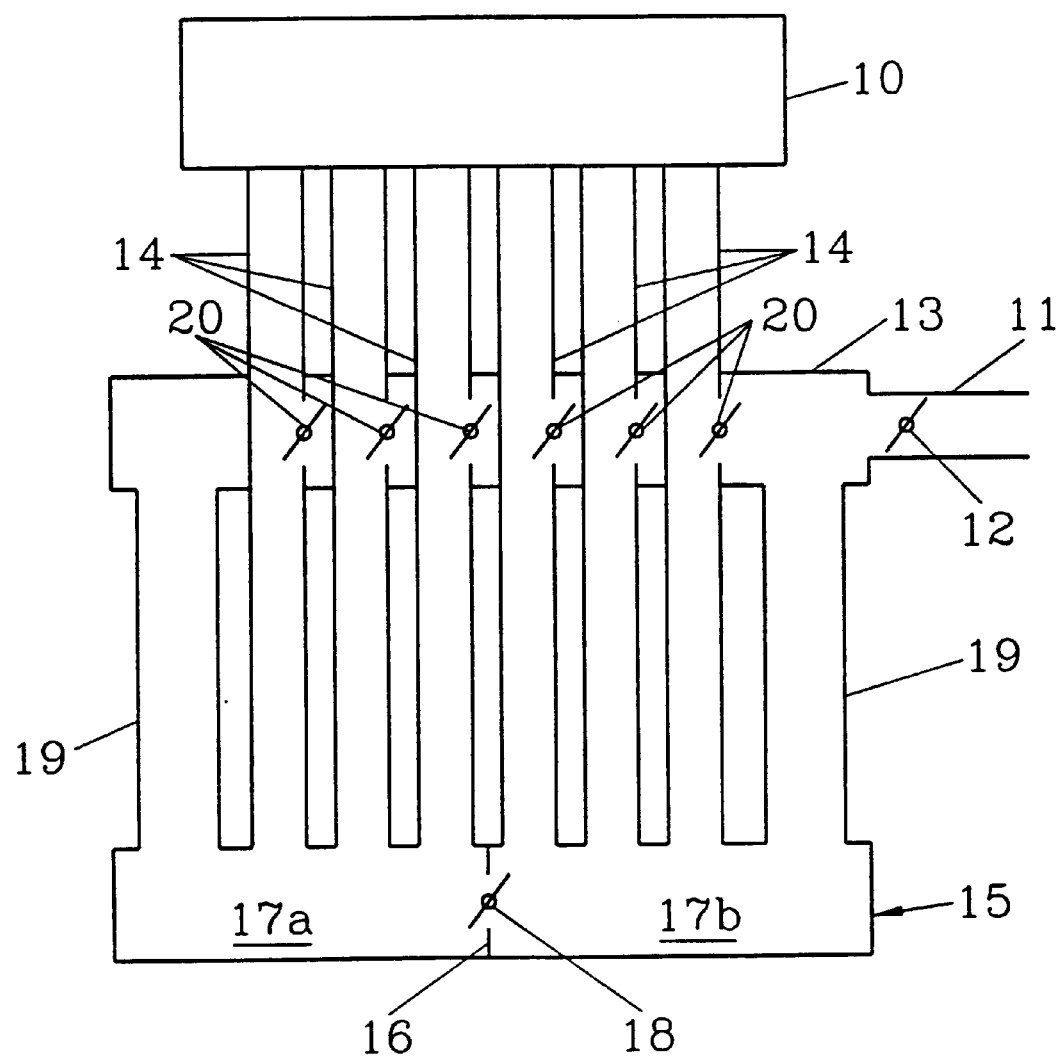

FIG. 1 discloses an intake system for a six-cylinder internal combustion engine 10. The intake system comprises an outlet spigot 11 from a not disclosed air filter housing. A throttle valve 12 is provided in the outlet spigot, for control of the flow volume of the filtered intake air.

The outlet spigot 11 opens out into an air distribution chamber 13 which is located in connection with inlet pipes 14 extending between the inlet valve/valves of each motor cylinder and an additional air distribution chamber 15. This chamber 15 is divided by means of a partition wall 16 into two acoustically substantially equal volumes 17a, 17b. The partition wall 16 is provided with an openable valve 18 which enables for the two volumes to be acoustically interconnected into a common volume.

Each of the two volumes 17a, 17b of the chamber 15 is connected to the chamber 13 via a resonance pipe 19. Also, each of the six inlet pipes 14 is provided with its own passage into the chamber 13 which passage can be opened by means of a valve 20. Preferably, the resonance pipes have equally long acoustic length as those segments of the inlet pipes 14 which extend between the passage valves 20 and the chamber 15. On the contrary, the acoustic cross sectional area of the resonance pipes 19 differ from the acoustic cross sectional area of the inlet pipes 14. Preferably, the passage valves 20 are located at about one third of the distance from the motor 10 to the chamber 15.

The valve 18 can be operated between open and closed position via a not shown micro processor. This processor receives input which is based upon the speed of the engine, so that changeover from one mode to the other occurs automatically at a certain engine speed. In a corresponding way, the passage valves 20 can be operated simultaneously automatically between closed and open positions via corresponding control means with regard to the speed of the engine.

Figure 2:
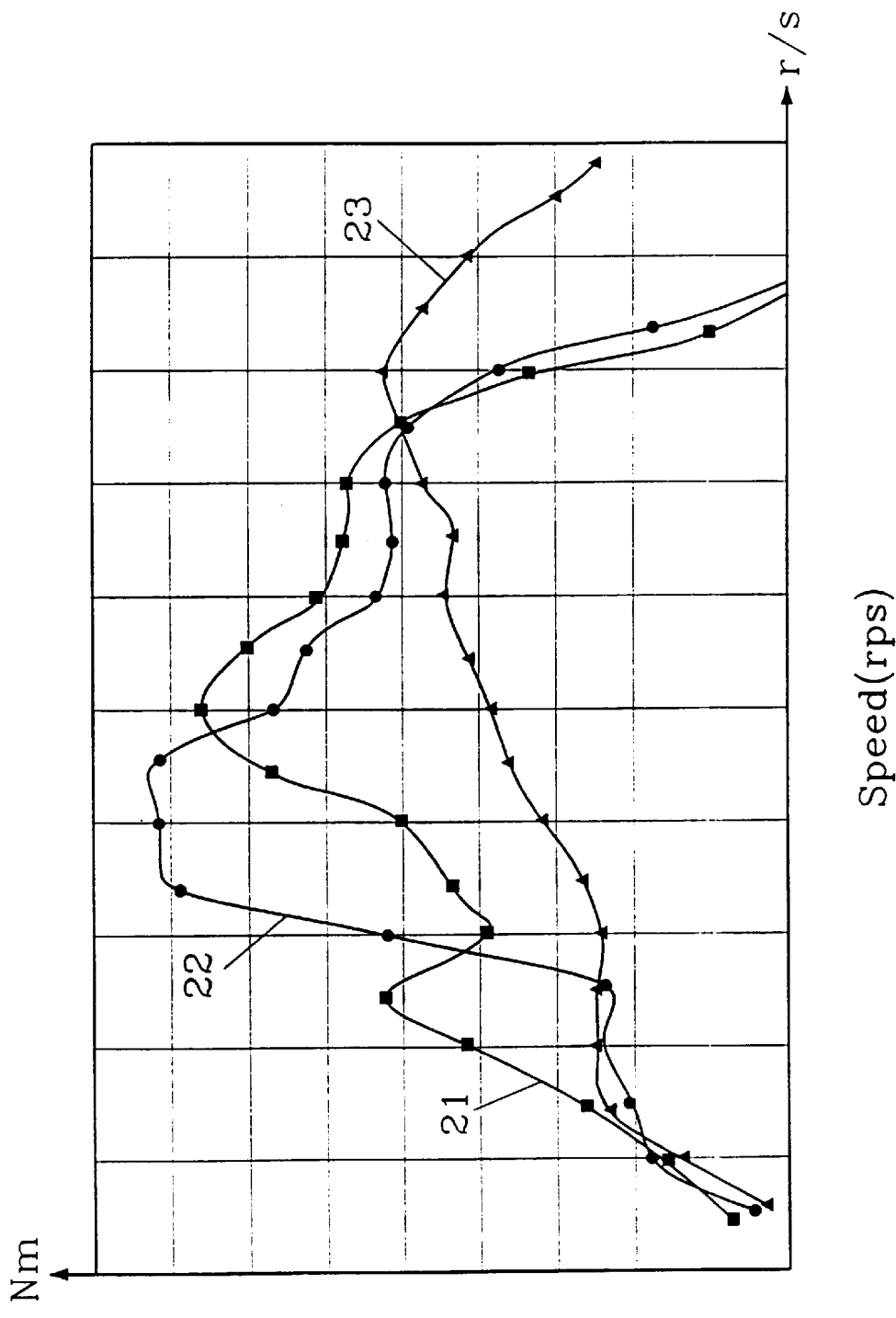
FIG. 2 is a diagram, which illustrates the technical effect of the intake system according to the invention.

FIG. 2 illustrates graphically the function of the inlet system, wherein the horizontal axis indicates increasing number of revolutions r/s and the vertical axis indicates increasing torque Nm.

Within a low range of engine speed, which is illustrated by the graph 21, an advantageous torque is obtained with closed valves 18 and 20. Hereby the oscillation period of the air volume in the intake system is determined by the acoustic length of the inlet pipes 14, the air volume in the chamber section 17a and 17b respectively, the air volume in the respective resonance pipes 19 and the air volume in the chamber 13.

Within a medium range of engine speed, which is illustrated by the graph 22, an advantageous torque is obtained with the valve 18 in its open position. Hereby the oscillation period of the air volume in the inlet system is determined by the acoustic length of the inlet pipes 14.

Within a higher range of engine speed, which is illustrated by the graph 23, an advantageous torque is obtained with the valves 18 and 20 open. Hereby the oscillation period of the air volume in the inlet system is determined by the acoustic length of the first third of the resonance pipes 14.

As FIG. 2 illustrates, it is also possible to use a mode of operation in accordance with graph 21, after passing the peak of graph 22, wherein a more even transition to graph 23 is obtained.

Preferably, all valves 20 are arranged along a common shaft, so that they are opened and closed simultaneously.

Figure 3:
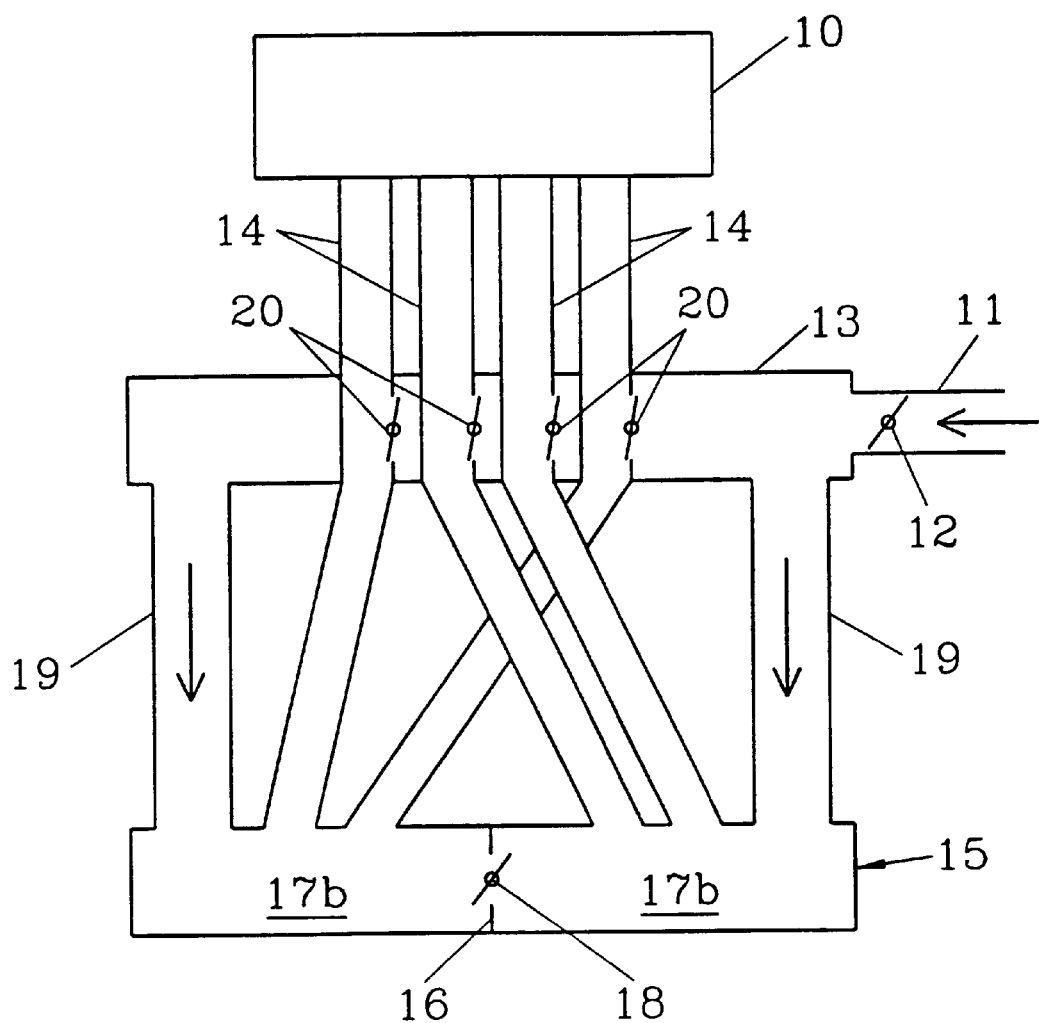
FIG. 3 shows in the same manner as FIG. 1 an intake system which is adapted for a four-cylinder combustion engine.

FIG. 3 discloses a alternative embodiment of the intake system which is adapted for a four-stroke internal combustion engine having four in-line cylinders. The inlet pipes 14 to both end cylinders are connected to one of the chamber volumes 17a, and the intake pipes 14 to the two interjacent cylinders are connected to the second chamber volume 17b. This involves making the inlet pipe 14 for one of the two outer cylinders cross the inlet pipes of the two interjacent cylinders. However, the inlet pipes run the shortest distance between the motor and the valves to the chamber 13.

Figure 4:
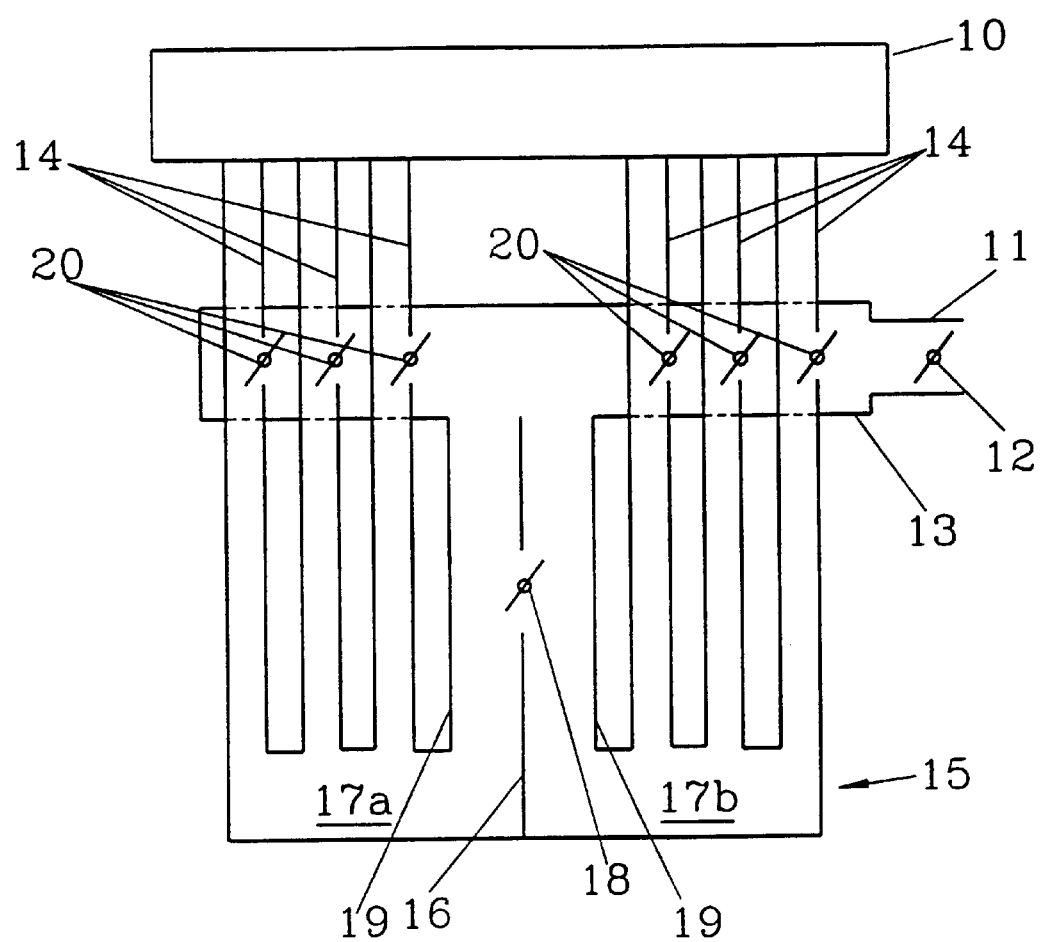
FIG. 4 shows an alternative design of the first air distribution chamber and the resonance pipes.

FIG. 4 shows still another embodiment of the inlet system, in which the resonance pipes 19 are centrally located between two groups of inlet pipes 14. This figure shows that the valve 18 of the first air distribution chamber 15 does not have to be located inside the first air distribution chamber 15, but instead may form an openable connection between the resonance pipes 19 at a suitable location between the two air distribution chambers 13, 15.

The invention is of course not limited to the disclosed embodiments, but a number of modifications are conceivable within the scope of the following claims, and consequently the invention can of course also be applied to engines with other cylinder configurations than in the shown embodiments. Further, the first air distribution chamber may be designed in many different ways, e.g. as two separate units, which are interconnected via an openable passage of suitable length.

I claim:

1. An intake system for internal combustion engines with multiple cylinders, comprising a first air distribution chamber, one separate inlet pipe for each engine cylinder, which inlet pipes extend between the first distribution chamber and a respective inlet valve of the corresponding cylinder, and a second air distribution chamber, which is connectable to each one of the inlet pipes between said first chamber and the inlet valves via a respective passage which is operable by way of respective valves, which valves are simultaneously operable between closed and open positions via control means which operate the valves based on the speed of the engine, the second air distribution chamber receiving inlet air via an adjustable throttle valve, the first air distribution chamber being divided into two volumes that are connectable via an additional openable valve, and the valve of the first air distribution chamber being maneuverable between closed and open positions via control means which operate the valve based on the speed of the engine.

2. An intake system according to claim 1, wherein the intake system is operational in three operational modes, wherein in a first mode of operations, both the passage valves and the valve of the first air distribution chamber are in a closed position, in a second mode of operation, the passage valves are in a closed position and the valve of the first air distribution chamber is in the open position, and in a third mode of operation, the passage valves are in an open position and one valve of the first air distribution chamber is in an open position.

3. An intake system according to claim 1, wherein the passage valves are mounted on a common maneuvering shaft.

4. An intake system according to claim 1, wherein the two volumes are connected to the second air distribution chamber by resonance pipes, the resonance pipes having the same acoustic length as the acoustic length of the inlet pipes between the first and the second air distribution chamber.

5. An intake system according to claim 1, wherein the two volumes are connected to the second air distribution chamber by resonance pipes the acoustic cross-sectional area of the resonance pipes differs from the acoustic cross-sectional area of the inlet pipes.

6. An intake system according to claim 1, adapted to a four cycle combustion engine having four in-line cylinders, the inlet pipes to both end cylinders being connected to one of the volumes, and the intake pipes to the two interjacent cylinders being connected to the second chamber volume.

\* \* \* \* \*